No. 811,156. PATENTED JAN. 30, 1906.
F. LIESKE.
HEN'S NEST.
APPLICATION FILED MAY 24, 1904. RENEWED SEPT. 6, 1905.

Witnesses
Wm. Koerth
A. G. Huylman

Inventor
Frank Lieske,
By Victor J. Evans
Attorney

UNITED STATES PATENT OFFICE.

FRANK LIESKE, OF MARQUETTE, MICHIGAN, ASSIGNOR OF ONE-HALF TO JOHN J. MORIARTY, OF HUDSON, MICHIGAN.

HEN'S NEST.

No. 811,156.      Specification of Letters Patent.      Patented Jan. 30, 1906.

Application filed May 24, 1904. Renewed September 6, 1905. Serial No. 277,258.

*To all whom it may concern:*

Be it known that I, FRANK LIESKE, a citizen of the United States, residing at Marquette, in the county of Marquette and State of Michigan, have invented new and useful Improvements in Hens' Nests, of which the following is a specification.

My invention has relation to improvements in poultry culture in the primary class of live stock, and particularly to improvements in nests; and the object is to simplify and improve the existing art by providing an artificial nest acceptable to a fertile fowl for nesting purposes and which will automatically transmit an egg into a depository, so that the eggs will not accumulate in the nest and be subjected to deleterious effects of variable temperatures or liability of being broken by movements of the occupant of the nest.

The invention embodies a box, a nest disposed in the box, an opening in the bottom of the nest and box, a yielding closure for the bottom opening in the nest, a decoy-egg on the closure, and a yielding floor beneath, onto which the eggs are delivered.

I have fully and clearly illustrated the improvement in the annexed drawings, to be taken as a part of this specification.

Figure 1:
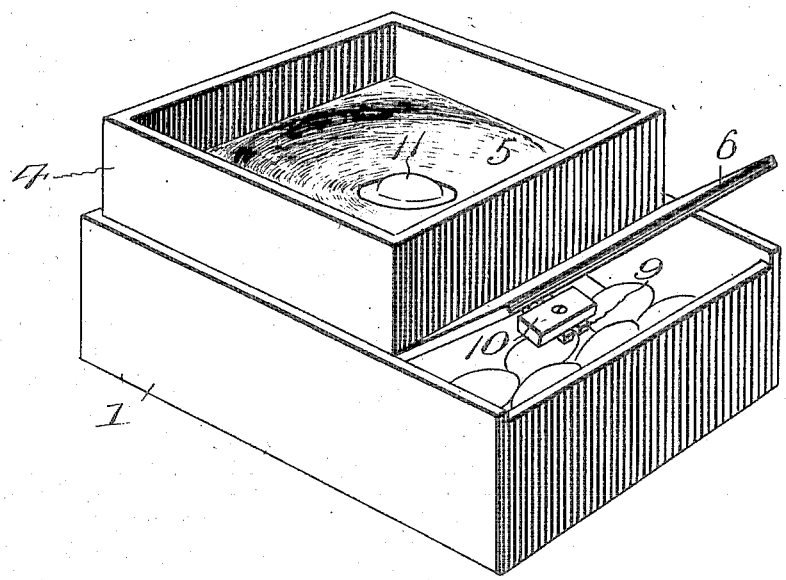
Figure 2:
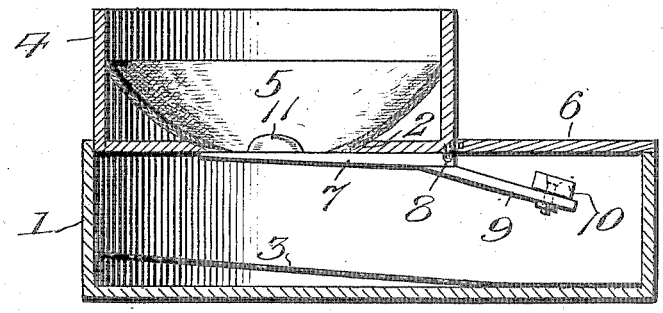
Figure 3:
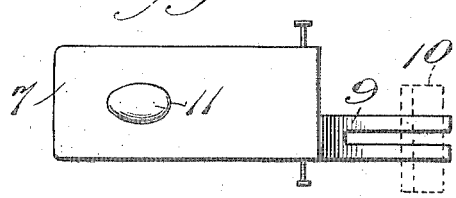
Figure 4:
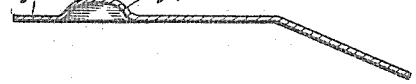

Reference being had to the drawings, Figure 1 is a perspective view of the complete device, showing the lid of the depository as open. Fig. 2 is a vertical longitudinal section through the device, showing the parts as in operative combination. Fig. 3 is a plan view of the yielding bottom to the nest. Fig. 4 is a longitudinal section of a yielding bottom of modified construction, being made of metal with the decoy stamped therein.

In the drawings, the same parts appearing, different illustrations are designated by similar reference-notations.

Referring to the drawings, 1 designates a base-box made preferably rectangular in contour and of such dimensions as may be desired to suit it to the purposes intended. This box constitutes the depository to receive the eggs which may be dropped in the nest. In the cover of the box 1 is made an opening 2, in which the nest is positioned substantially as seen in Fig. 2 of the drawings. In the box 1 is arranged false bottom 3, consisting of some textile material, which is arranged at an incline, as shown, so that when an egg is dropped through from the nest it will land on a yielding surface and not be broken and will then roll down the incline into the end of the box under the hinged lid.

4 designates the nest-box positioned on the base-box 1 and made shorter than the latter, so as to leave room for the lid which covers the space left in the top of the base-box, as shown in the drawings. In the nest-box is arranged and secured the nest 5, preferably of a dish or bowl shape, as indicated, and is made with an opening in its bottom large enough to freely permit an egg to pass through. The nest is placed in the opening 2 of the base-box 1 and is also lodged with its diametrically opposite points bearing against the sides of the box 4 to keep it in proper position.

6 designates the hinged cover or lid having its inner edge pivotally secured to the lower edge of the end of the nest-box and is adapted to cover and close the extending part of the base-box 1, as shown.

7 designates an automatically-acting closure for the opening in the bottom of the nest, having one end hinged to the bottom of the nest-box, as at 8, and is provided with an extending-arm 9, provided with an adjustable weight 10, which may be arranged to counterbalance the closure 7 when depressed or opened and then return it to normal position. On the plate 7 is formed or secured a representation of half an egg 11, which when the closure is in the position shown in Figs. 1 and 2 projects into the nest and serves as a decoy or lure to innocently entice the fowl to occupancy.

In Fig. 4 I have illustrated a closure made of metal with the half egg stamped therein. The egg part may be painted white to effect the purpose intended.

The operation of the device may be stated as follows: The hen on entering the nest seats herself ready for duty, and the closure is depressed by her weight, so as to partly open the bottom of the nest, and when the delivery is made the hen rises, and the bottom is fully opened, and the egg falls out through the opening into the receptacle below. Should the closure not be opened by this procedure, the closure, being lightly held by the weight, is opened by the extra weight of the egg, which overcomes that of the weight 10, and the egg drops down into the receptacle.

The interior of the nest may be made of any suitable material, such as nicely-twisted hay or straw or some such material.

The device, it will be readily perceived, is entirely practical and may be made at but very little cost and labor. It will also be perceived that the use of my improved hen's nest prevents the hen from eating the eggs, as some hens will do, especially in the winter season. The deposition of the eggs into the casing also secures them from rats or other predatory animals of the kind which raid henneries.

I am aware that it is not broadly new to construct a hen's nest with an opening in the lower end thereof controlled by means of a pivotally-mounted platform, and I do not claim this structure broadly, as my invention consists of the improvements and details of construction hereinafter specified.

Having thus described my invention, what I claim is—

A hen's nest comprising a base-box, a supplemental inclined cloth floor suspended above the bottom of said box, a nest-box of shorter length than the base-box mounted upon one end of said base-box, a hinged lid covering the top portion of said base-box not covered by the nest-box, a circular dish-shaped nest arranged in said nest-box, and having an opening in its lower portion, a hinged plate covering said opening in the nest and having a decoy-egg thereon, and a weight connected with the hinged plate.

In testimony whereof I affix my signature in presence of two witnesses.

FRANK LIESKE.

Witnesses:
WALTER J. WALSH,
JOHN FITZGEARLD.